US010399195B2

United States Patent
Liu et al.

(10) Patent No.: US 10,399,195 B2
(45) Date of Patent: Sep. 3, 2019

(54) STATIONARY FIXTURE FOR MACHINING OF ALUMINUM ALLOY WHEEL

(71) Applicant: CITIC Dicastal CO., LTD, Qinhuangdao (CN)

(72) Inventors: Xiao Liu, Qinhuangdao (CN); Jiandong Guo, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/188,680

(22) Filed: Nov. 13, 2018

(65) Prior Publication Data
US 2019/0160613 A1 May 30, 2019

(30) Foreign Application Priority Data

Nov. 30, 2017 (CN) .................. 2017 1 12353864

(51) Int. Cl.
*B23Q 1/00* (2006.01)
*B23Q 3/06* (2006.01)
*B23Q 3/08* (2006.01)
B23B 41/00 (2006.01)
B23Q 3/00 (2006.01)

(52) U.S. Cl.
CPC ............ *B23Q 3/062* (2013.01); *B23Q 3/082* (2013.01); *B23B 41/00* (2013.01); *B23Q 3/007* (2013.01); *B23Q 2703/06* (2013.01); *B23Q 2703/10* (2013.01)

(58) Field of Classification Search
CPC ... B23Q 1/00; B23Q 1/03; B23Q 1/25; B23Q 3/00; B23Q 3/06
See application file for complete search history.

(56) References Cited

U.S. PATENT DOCUMENTS

| 4,419,031 | A | * | 12/1983 | Palma | ...... B27C 3/06 144/365 |
| 4,696,096 | A | * | 9/1987 | Green | ...... B23K 1/012 228/180.21 |
| 8,082,642 | B1 | * | 12/2011 | McCulloch | ...... B23C 1/12 29/26 A |
| 2008/0047120 | A1 | * | 2/2008 | Soroka | ...... B23Q 1/01 29/27 C |
| 2010/0194013 | A1 | * | 8/2010 | Hall | ...... C02F 1/006 269/56 |
| 2014/0373353 | A1 | * | 12/2014 | Westergaard | ...... F03D 80/70 29/889 |

* cited by examiner

*Primary Examiner* — Lee D Wilson
(74) *Attorney, Agent, or Firm* — Calfee, Halter & Griswold LLP

(57) ABSTRACT

The present application provides a stationary fixture for machining of an aluminum alloy wheel, includes a machine tool base, first supports, end covers, a first power shaft, bearings, a second end cover, and the like, wherein the first support and a second support are mounted on the machine tool base, the first power shaft is mounted inside a bearing seat, a group of bearings is mounted between the bearing seat and the first power shaft, a nut is mounted at the left end of each bearing to position the inner ring of the bearing, the first end cover is mounted on the left side of the bearing seat at the upper end of the first support by screws, the first sealing ring is mounted between the first end cover and the first power shaft, and the second end cover is fixed to the right side of the bearing seat.

1 Claim, 3 Drawing Sheets

STATIONARY FIXTURE FOR MACHINING OF ALUMINUM ALLOY WHEEL

CROSS-REFERENCE TO RELATED APPLICATIONS

This application claims priority to Chinese Patent Application No. 201711235386.4, filed on Nov. 30, 2017, which is hereby incorporated by reference in its entirety.

TECHNICAL FIELD

The present application relates to the field of automobile engineering, specifically to a wheel fixture.

BACKGROUND ART

The machining process for a wheel usually requires three-step machining. After the front, the rim, the center hole and other parts of the wheel are machined, bolt holes and a valve hole need to be machined in the third step, but due to the difference in the outer diameter and width of wheels and other parameters, it is difficult to machine different sizes of hubs with a set of fixture. In the actual machining process, whenever wheels of different sizes need to be replaced, a set of parts or even a complete set of fixture needs to be replaced, which increases the production assistance time of the workshop, reduces the production efficiency and increases the labor intensity of workers. If an automatic fixture adapting to different sizes of wheels can be researched and developed, the production efficiency is greatly improved.

SUMMARY OF THE INVENTION

The purpose of the present application is to provide a wheel fixture that may position and clamp different sizes of wheels and achieves automatic machining.

A stationary fixture for machining of an aluminum alloy wheel is composed of a machine tool base 1, a first support 2, a rotary joint 3, a first end cover 4, nuts 5, a first power shaft 6, a first sealing ring 7, bearings 8, a second end cover 9, a second sealing ring 10, a first L-shaped plate 11, airtight mechanisms 12, a power chuck 13, clamping jaws 14, a wheel 15, a first support plate 16, a linear single-axis robot 17, a second support plate 18, a second L-shaped plate 19, a third end cover 20, a first decelerator 21, a second power shaft 22, a first servo motor 23, a fourth end cover 24, a second support 25, a coupling 26, a connecting plate 27, a second decelerator 28, a second servo motor 29, a positioning column 30, a first hydraulic cylinder 31, a base 32, a movable plate 33, a dynamic friction plate 34, a static friction plate 35, a lip rubber sealing ring 36, second hydraulic cylinders 37, guide rails 38, pressure blocks 39, positioning plates 40, a first guide rail 41 and a second guide rail 42.

The first support 2 and the second support 25 are mounted on the machine tool base 1 by bolts, the first power shaft 6 is mounted inside a bearing seat at the upper end of the first support 2, a group of bearings 8 is mounted between the bearing seat and the first power shaft 6, a nut 5 is mounted at the left end of each bearing 8. The nut 5 is used to position the inner ring of the bearing 8, the first end cover 4 is mounted on the left side of the bearing seat at the upper end of the first support 2 by screws, the first sealing ring 7 is mounted between the first end cover 4 and the first power shaft 6, the second end cover 9 is fixed to the right side of the bearing seat at the upper end of the first support 2 by screws, the second sealing ring 10 is mounted between the second end cover 9 and the first power shaft 6, the first L-shaped plate 11 is mounted on the first power shaft 6 by screws, the dynamic friction plate 34 is mounted on the first L-shaped plate 11, the static friction plate 35 and the lip rubber sealing ring 36 are mounted at the right end of the first support 2, the lip rubber sealing ring 36 is connected with an oil passage inside the first support 2, and the rotary joint 3 is mounted at the left end of the first power shaft 6. The first decelerator 21 is mounted inside the support seat. The support seat is at the upper end of the second support 25, the first servo motor 23 is mounted at the right end of the first decelerator 21, the fourth end cover 24 is mounted at the right end of the support seat by screws, the third end cover 20 is mounted at the left end of the support seat, the second power shaft 22 is mounted at the output end of the first decelerator 21, and the second L-shaped plate 19 is mounted on the second power shaft 22 by screws. The base 32 is mounted on the first L-shaped plate 11 and the second L-shaped plate 19 by screws, the first hydraulic cylinder 31 is mounted on the base 32 via the positioning column 30 and screws, the power chuck 13 is mounted on the first hydraulic cylinder 31, a group of clamping jaws 14 is mounted on the power chuck 13, the second support plate 18 is mounted on the base 32 by screws, the linear single-axis robot 17 penetrates through the base 32 and is mounted on the second support plate 18, the output end of the second decelerator 28 is mounted on the output shaft of the linear single-axis robot 17 via the connecting plate 27 and the coupling 26, the output end of the second servo motor 29 is mounted on the input end of the second decelerator 28, the first support plate 16 is simultaneously mounted on a slider of the linear single-axis robot 17 and the movable plate 33, the two groups of airtight mechanisms 12 are mounted on the movable plate 33, the four positioning plates 40 are mounted on the movable plate 33, the four guide rails 38 are mounted and fixed on the movable plate 33, the four groups of second hydraulic cylinder 37 are mounted on the four guide rails 38, and the pressure blocks 39 are mounted at the output ends of the second hydraulic cylinder 37. The first L-shaped plate 11 is provided with a plurality of oil passages, the oil passages pass through the first power shaft 6 and are connected with a hydraulic source via the rotary joint 3, an oil passage is processed at the upper end of the first support 2, and the first hydraulic cylinder 31 and the second hydraulic cylinder 37 are connected to the oil passages on the first L-shaped plate 11 via joints and oil pipes. The first guide rail 41 and the second guide rail 42 are mounted on the bottom plate 32.

In actual use, after the wheel 15 is placed on the positioning plates 40 of the fixture, the airtight mechanisms 12 determines whether the wheel 15 is at the correct position by the feedback of the pressure. The pressure is from the wheel 15 pressing the airtight mechanisms 12, the system will give an alarm if the position of the wheel 15 is wrong, the second servo motor 29 drives the linear single-axis robot 17 through the second decelerator 28 if the position of the wheel 15 is correct. The linear single-axis robot 17 drives the movable plate 33 to adjust to a suitable height, during this process, the first guide rail 41, the second guide rail 42 and the linear single-axis robot 17 ensure that the movable plate 33 lifts and drops stably, at this time, the first hydraulic cylinder 31 drives the power chuck 13 to work so that the clamping jaws 14 goes deep into the center hole of the wheel and expand the wheel 15, and after the wheel 15 is positioned radially and axially, the second hydraulic cylinder 37 drive the pressure blocks 39 to position and clamp the wheel 15 at the determined position. The main spindle of the machine tool drives the cutting tool to machine bolt holes after positioning and clamping, then the first servo motor 23 drives the second power shaft 22 and the second L-shaped plate 19 to rotate to an angle through the first decelerator 21, at the moment, hydraulic oil compresses the static friction plate 35 and the dynamic friction plate 34 via the oil passage inside the first support 2 to realize an sub-degree positioning function, and the main spindle of the machine tool drives the cutting tool to machine a valve hole after the angle is fixed.

According to the technical scheme of the present application, the appropriate height of the movable plate is adjusted by adopting the linear single-axis robot, thereby saving the guiding scheme of a plurality of guide pillars used in the common flexible fixture. The present application simplifys the structure of the fixture, and has the following advantages, such as wide size adaptation range, high adjustment speed, high reliability and the like.

BRIEF DESCRIPTION OF DRAWINGS

The embodiments of the present invention will be described in detail below in combination with the drawings, in which.

Figure 1:
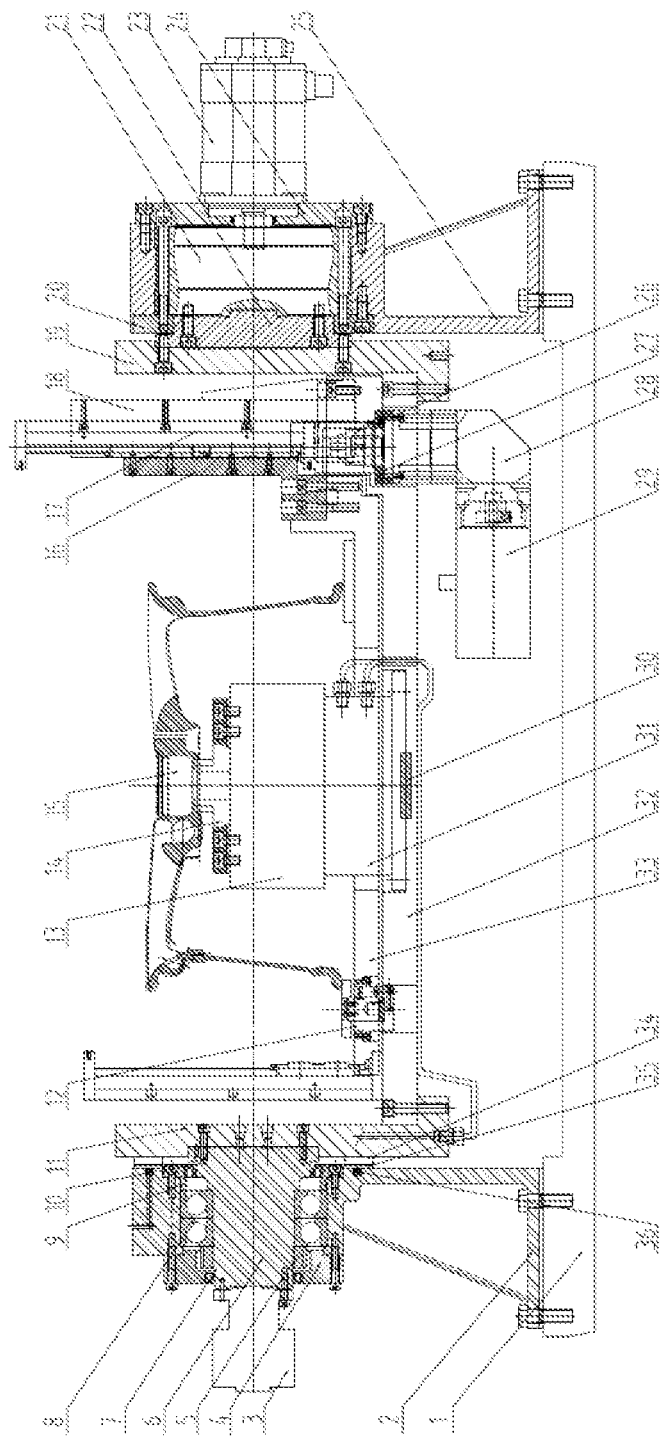
FIG. 1 is a front view of a stationary fixture for machining of an aluminum alloy wheel according to the present application.
Figure 2:
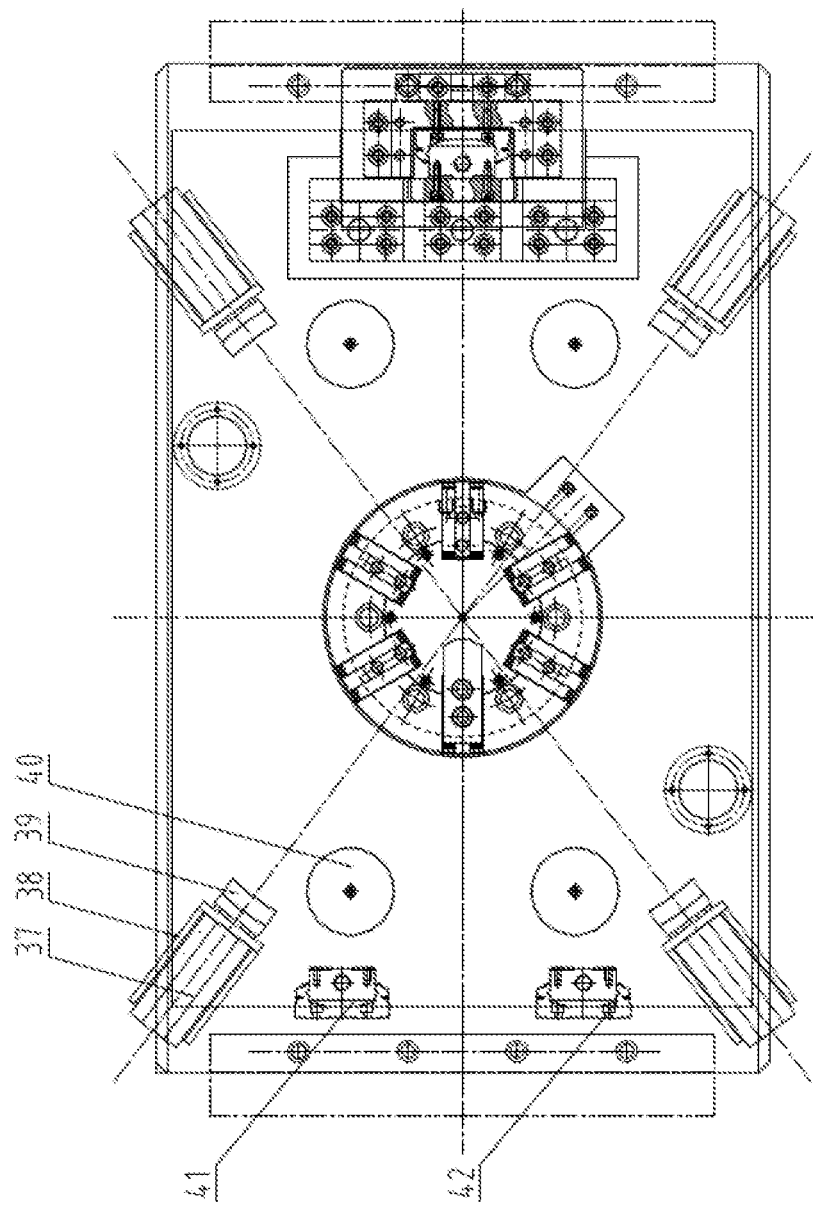
FIG. 2 is a partial top view of the stationary fixture for machining of an aluminum alloy wheel according to the present application.
Figure 3:
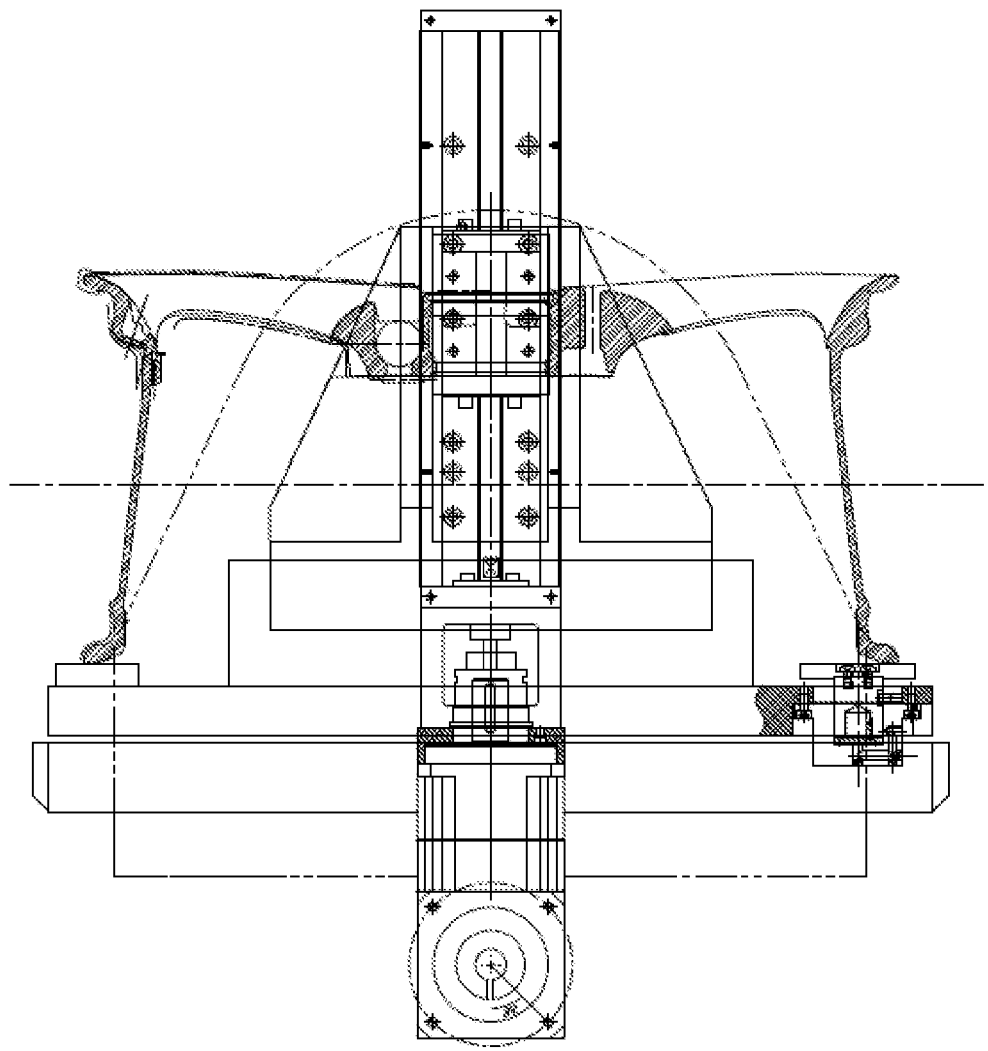
FIG. 3 is a partial left view of the stationary fixture for machining of an aluminum alloy wheel according to the present application.

In figures: 1—machine tool base, 2—first support, 3—rotary joint, 4—first end cover, 5—nut, 6—first power shaft, 7—first sealing ring, 8—bearing, 9—second end cover, 10—second sealing ring, 11—First L—shaped plate, 12—airtight mechanism, 13—power chuck, 14—clamping jaw, 15—wheel, 16—first support plate, 17—linear single—axis robot, 18—second support plate 19—Second L—shaped plate, 20—third end cover, 21—first decelerator, 22—second power shaft, 23—first servo motor, 24—fourth end cover, 25—second support, 26—coupling, 27—connecting plate, 28—second decelerator, 29—second servo motor, 30—positioning column, 31—first hydraulic cylinder, 32—base, 33—movable plate, 34—dynamic friction plate, 35—static friction plate, 36—lip rubber sealing ring, 37—hydraulic cylinder II, 38—guide rail, 39—pressure block, 40—positioning plate, 41—first guide rail, 42—second guide rail.

DETAILED DESCRIPTION OF THE INVENTION

The specific embodiments of the present application will be further described in detail below in combination with the drawings.

A stationary fixture for machining of an aluminum alloy wheel is composed of a machine tool base 1, a first support 2, a rotary joint 3, a first end cover 4, nuts 5, a first power shaft 6, a first sealing ring 7, bearings 8, a second end cover 9, a second sealing ring 10, a first L-shaped plate 11, airtight mechanisms 12, a power chuck 13, clamping jaws 14, a wheel 15, a first support plate 16, a linear single-axis robot 17, a second support plate 18, a second L-shaped plate 19, a third end cover 20, a first decelerator 21, a second power shaft 22, a first servo motor 23, a fourth end cover 24, a second support 25, a coupling 26, a connecting plate 27, a second decelerator 28, a second servo motor 29, a positioning column 30, a first hydraulic cylinder 31, a base 32, a movable plate 33, a dynamic friction plate 34, a static friction plate 35, a lip rubber sealing ring 36, second hydraulic cylinder 37, guide rails 38, pressure blocks 39, positioning plates 40, a first guide rail 41 and a second guide rail 42.

The first support 2 and the second support 25 are mounted on the machine tool base 1 by bolts, the first power shaft 6 is mounted inside a bearing seat at the upper end of the first support 2, a group of bearings 8 is mounted between the bearing seat and the first power shaft 6, a nut 5 is mounted at the left end of each bearing 8. The nut 5 is used to position the inner ring of the bearing 8, the first end cover 4 is mounted on the left side of the bearing seat at the upper end of the first support 2 by screws, the first sealing ring 7 is mounted between the first end cover 4 and the first power shaft 6, the second end cover 9 is fixed to the right side of the bearing seat at the upper end of the first support 2 by screws, the second sealing ring 10 is mounted between the second end cover 9 and the first power shaft 6, the first L-shaped plate 11 is mounted on the first power shaft 6 by screws, the dynamic friction plate 34 is mounted on the first L-shaped plate 11, the static friction plate 35 and the lip rubber sealing ring 36 are mounted at the right end of the first support 2, the lip rubber sealing ring 36 is connected with an oil passage inside the first support 2, and the rotary joint 3 is mounted at the left end of the first power shaft 6.

The first decelerator 21 is mounted inside the support seat. The support seat is at the upper end of the second support 25, the first servo motor 23 is mounted at the right end of the first decelerator 21, the fourth end cover 24 is mounted at the right end of the support seat by screws, the third end cover 20 is mounted at the left end of the support seat, the second power shaft 22 is mounted at the output end of the first decelerator 21, and the Second L-shaped plate 19 is mounted on the second power shaft 22 by screws.

The base 32 is mounted on the First L-shaped plate 11 and the Second L-shaped plate 19 by screws, the first hydraulic cylinder 31 is mounted on the base 32 via the positioning column 30 and screws, the power chuck 13 is mounted on the first hydraulic cylinder 31, a group of clamping jaws 14 is mounted on the power chuck 13, the second support plate 18 is mounted on the base 32 by screws, the linear single-axis robot 17 penetrates through the base 32 and is mounted on the second support plate 18, the output end of the second decelerator 28 is mounted on the output shaft of the linear single-axis robot 17 via the connecting plate 27 and the coupling 26, the output end of the second servo motor 29 is mounted on the input end of the second decelerator 28, the first support plate 16 is simultaneously mounted on a slider of the linear single-axis robot 17 and the movable plate 33, the two groups of airtight mechanisms 12 are mounted on the movable plate 33, the four positioning plates 40 are mounted on the movable plate 33, the four guide rails 38 are mounted and fixed on the movable plate 33, the four groups of second hydraulic cylinder 37 are mounted on the four guide rails 38, and the pressure blocks 39 are mounted at the output ends of the second hydraulic cylinder 37. The first L-shaped plate 11 is provided with a plurality of oil passages, the oil passages pass through the first power shaft 6 and are connected with a hydraulic source via the rotary joint 3, an oil passage is processed at the upper end of the first support 2, and the first hydraulic cylinder 31 and the second hydraulic cylinder 37 are connected to the oil passages on the First L-shaped plate 11 via joints and oil pipes. The first guide rail 41 and the second guide rail 42 are mounted on the bottom plate 32.

In actual use, after the wheel 15 is placed on the positioning plates 40 of the fixture, the airtight mechanisms 12 determines whether the wheel 15 is at the correct position by the feedback of the pressure. The pressure is from the wheel 15 pressing the airtight mechanisms 12, the system will give an alarm if the position of the wheel 15 is wrong, the second servo motor 29 drives the linear single-axis robot 17 through the second decelerator 28 if the position of the wheel 15 is correct. The linear single-axis robot 17 drives the movable plate 33 to adjust to a suitable height, during this process, the first guide rail 41, the second guide rail 42 and the linear single-axis robot 17 ensure that the movable plate 33 lifts and drops stably, at this time, the first hydraulic cylinder 31 drives the power chuck 13 to work so that the clamping jaws 14 goes deep into the center hole of the wheel and expand the wheel 15, and after the wheel 15 is positioned radially and axially, the second hydraulic cylinder 37 drive the pressure blocks 39 to position and clamp the wheel 15 at the determined position. The mail spindle machine tool drives the cutting tool to machine bolt holes after positioning and clamping, then the first servo motor 23 drives the second power shaft 22 and the second L-shaped plate 19 to rotate to an angle through the first decelerator 21, at the moment, hydraulic oil compresses the static friction plate 35 and the dynamic friction plate 34 via the oil passage inside the first support 2 to realize an sub-degree positioning function, and the main spindle of the machine tool drives the cutting tool to machine a valve hole after the angle is fixed.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A stationary fixture for machining of an aluminum alloy wheel, comprising a machine tool base, a first support, a rotary joint, a first end cover, nuts, a first power shaft, a first sealing ring, bearings, a second end cover, a second sealing ring, a first L-shaped plate, airtight mechanisms, a power chuck, clamping jaws, a wheel, a first support plate, a linear single-axis robot, a second support plate, a second L-shaped plate, a third end cover, a first decelerator, a second power shaft, a first servo motor, a fourth end cover, a second support, a coupling, a connecting plate, a second decelerator, a second servo motor, a positioning column, a first hydraulic cylinder, a base, a movable plate, a dynamic friction plate, a static friction plate, a lip rubber sealing ring, second hydraulic cylinders, guide rails, pressure blocks, positioning plates, a first guide rail and a second guide rail, wherein that the first support and the second support are mounted on the machine tool base by bolts, the first power shaft is mounted inside a bearing seat at the upper end of the first support, a group of bearings is mounted between the bearing seat and the first power shaft, a nut is mounted at the left end of each bearing, the nut is used to position the inner ring of the bearing, the first end cover is mounted on the left side of the bearing seat at the upper end of the first support by screws, the first sealing ring is mounted between the first end cover and the first power shaft, the second end cover is fixed to the right side of the bearing seat at the upper end of the first support by screws, the second sealing ring is mounted between the second end cover and the first power shaft, the first L-shaped plate is mounted on the first power shaft by screws, the dynamic friction plate is mounted on the first L-shaped plate, the static friction plate and the lip rubber sealing ring are mounted at the right end of the first support, the lip rubber sealing ring is connected with an oil passage inside the first support, and the rotary joint is mounted at the left end of the first power shaft; the first decelerator is mounted inside the support seat, and the support seat is at the upper end of the second support, the first servo motor is mounted at the right end of the first decelerator, the fourth end cover is mounted at the right end of the support seat by screws, the third end cover is mounted at the left end of the support seat, the second power shaft is mounted at the output end of the first decelerator, and the second L-shaped plate is mounted on the second power shaft by screws; the base is mounted on the first L-shaped plate and the second L-shaped plate by screws, the first hydraulic cylinder is mounted on the base via the positioning column and screws, the power chuck is mounted on the first hydraulic cylinder, a group of clamping jaws is mounted on the power chuck, the second support plate is mounted on the base by screws, the linear single-axis robot penetrates through the base and is mounted on the second support plate, the output end of the second decelerator is mounted on the output shaft of the linear single-axis robot via the connecting plate and the coupling, the output end of the second servo motor is mounted on the input end of the second decelerator, the first support plate is simultaneously mounted on a slider of the linear single-axis robot and the movable plate, the two groups of airtight mechanisms are mounted on the movable plate, the four positioning plates are mounted on the movable plate, the four guide rails are mounted and fixed on the movable plate, the four groups of second hydraulic cylinder are mounted on the four guide rails, and the pressure blocks are mounted at the output ends of the second hydraulic cylinder; the first L-shaped plate is provided with a plurality of oil passages, the oil passages pass through the first power shaft and are connected with a hydraulic source via the rotary joint, an oil passage is processed at the upper end of the first support, and the first hydraulic cylinder and the second hydraulic cylinder are connected to the oil passages on the first L-shaped plate via joints and oil pipes.

* * * * *